United States Patent
Zhang et al.

(10) Patent No.: US 9,442,715 B2
(45) Date of Patent: Sep. 13, 2016

(54) PATCH PROCESS ENSURING HIGH AVAILABILITY OF CLOUD APPLICATION

(71) Applicant: Microsoft Technology Licensing, LLC, Redmond, WA (US)

(72) Inventors: Jun Zhang, Sammamish, WA (US); Brian O'Connor, Kenmore, WA (US); Min Shao, Seattle, WA (US); Roshane Silva, Kirkland, WA (US); Morten Haavaldsen, Tromso (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 14/445,007

(22) Filed: Jul. 28, 2014

(65) Prior Publication Data

US 2016/0026453 A1   Jan. 28, 2016

(51) Int. Cl.
| | |
|---|---|
| G06F 9/44 | (2006.01) |
| G06F 9/445 | (2006.01) |
| H04L 12/26 | (2006.01) |
| H04L 29/08 | (2006.01) |
| G06F 9/50 | (2006.01) |
| G06F 11/00 | (2006.01) |

(52) U.S. Cl.
CPC .............. *G06F 8/65* (2013.01); *G06F 9/5072* (2013.01); *G06F 11/00* (2013.01); *H04L 43/0805* (2013.01); *H04L 67/10* (2013.01)

(58) Field of Classification Search
CPC ...................................................... G06F 8/65
See application file for complete search history.

(56) References Cited

U.S. PATENT DOCUMENTS

| | | | |
|---|---|---|---|
| 8,271,974 B2 | 9/2012 | Mazhar et al. | |
| 2004/0210653 A1* | 10/2004 | Kanoor | G06F 8/65 709/223 |

(Continued)

FOREIGN PATENT DOCUMENTS

| | | |
|---|---|---|
| WO | 2011162991 A2 | 12/2011 |
| WO | 2012054160 A2 | 4/2012 |

OTHER PUBLICATIONS

Mehaffey, "Runtime Application Patching for High Availability with Carrier-Grade Linux", Aug. 2003. Available at: http://www.rtcmagazine/articles/view/100182.

(Continued)

*Primary Examiner* — Philip Wang
(74) *Attorney, Agent, or Firm* — Julie Kane Akhter; Thomas Wong; Micky Minhas

(57) ABSTRACT

A cyclical patching process associated with a cloud application may be defined to ensure high availability (HA) of the cloud application in order to prevent impacting an availability to end users. A list of server identities corresponding to one or more servers of a datacenter hosting the cloud application may be accepted. HA metric values for each of the server identities may be determined in order to compute an overall HA metric value for the cloud application. A subset of the servers may be removed from a rotation framework of the cloud application based on the determined HA metric values, where the removal does not affect the overall HA metric value of the cloud application. One or more patches may be applied to each server within the subset of servers in parallel, and the subset of servers may be reinstated in the rotation framework of the cloud application.

20 Claims, 7 Drawing Sheets

(56) References Cited

U.S. PATENT DOCUMENTS

| | | | | |
|---|---|---|---|---|
| 2006/0075401 | A1* | 4/2006 | Smegner | G06F 8/65 717/174 |
| 2006/0101457 | A1* | 5/2006 | Zweifel | G06F 8/65 717/174 |
| 2006/0129846 | A1* | 6/2006 | Lambert | G06F 8/65 713/191 |
| 2010/0138822 | A1* | 6/2010 | Miyazaki | G06F 8/68 717/168 |
| 2011/0099266 | A1 | 4/2011 | Calder et al. | |
| 2012/0102220 | A1 | 4/2012 | Hopmann et al. | |
| 2012/0102480 | A1* | 4/2012 | Hopmann | G06F 8/67 717/172 |
| 2013/0067454 | A1 | 3/2013 | Thompson et al. | |
| 2013/0174163 | A1* | 7/2013 | Maeno | G06F 9/44 718/100 |
| 2014/0089488 | A1 | 3/2014 | Chong et al. | |
| 2015/0178063 | A1* | 6/2015 | Narkinsky | G06F 8/68 717/168 |

OTHER PUBLICATIONS

Mazgelis, "High Availability and the Patch Management Lifecycle", Published on Mar. 20, 2014. Available at: http://vmware.ulitzer.com/node/3022672.

"Patching an Oracle Identity Management high Availability Environment", Retrieved on May 5, 2014. Available at: http://docs.oracle.com/cd/E25178_01/doc.111/e16793/upgrade_idm_ha.htm.

Betts, "Farm Patching Explained-High Availability Sharepoint", published on Aug. 22, 2013. Available at: http://blogs.msdn.com/b/sambetts/archive/2013/08/22/sharepoint-farm-patching-explained.aspx.

International Search Report & Written Opinion Issued in PCT Application No. PCT/US2015/041435, Mailed Date: Nov. 19, 2015, 15 Pages.

Second Written Opinion Issued in PCT Application No. PCT/US2015/041435, Mailed Date: Apr. 29, 2016, 10 Pages.

* cited by examiner

PATCH PROCESS ENSURING HIGH AVAILABILITY OF CLOUD APPLICATION

BACKGROUND

A large cloud application with complex architecture may have various roles indicating one or more distinct subsystems of the cloud application. For example, the cloud application may include a web server role, a database role, a batch job role, and an index role, among other roles. Due to the function of the cloud application, the cloud application and/or a service provider may need to enforce security compliance, and also quickly evolve the cloud application to iterate on feedbacks and roll out new features, for example. Consequently, the cloud application and its hosted infrastructure may be regularly patched. Furthermore, end users may assume the cloud application and/or service may be visited anytime, anywhere. Thus, the regular patching of the cloud application and its hosting infrastructure should not impact usage. Such impact may be based on the high availability (HA) metric value of the cloud application, where the HA metric value of the cloud application is further based on the HA metric values of the various roles in the cloud application.

Current patching methods fail to consider the HA metric values of the various roles of the cloud applications and/or service, and also fail to provide a well-managed lifecycle of the patching process. Accordingly, current patching methods associated with cloud applications could use improvements and/or alternative or additional solutions, such that an automatic and cyclical patching process may be defined that enables a high availability of the applications to be maintained.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to definition of a patching process associated with a cloud application. A list of server identities corresponding to one or more servers of a datacenter hosting the cloud application may be accepted. High availability (HA) metric values for each of the server identities on the list may be determined in order to compute an overall HA metric value for the cloud application. A subset of the one or more servers may be removed from a rotation framework of the cloud application based on the determined HA metric values, where the removal of the subset of servers from the rotation framework does not affect the overall HA metric value of the cloud application. One or more patches may be applied to each server within the subset of servers in parallel, and the subset of servers in the rotation framework of the cloud application may be reinstated upon completion of the application of the patches.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
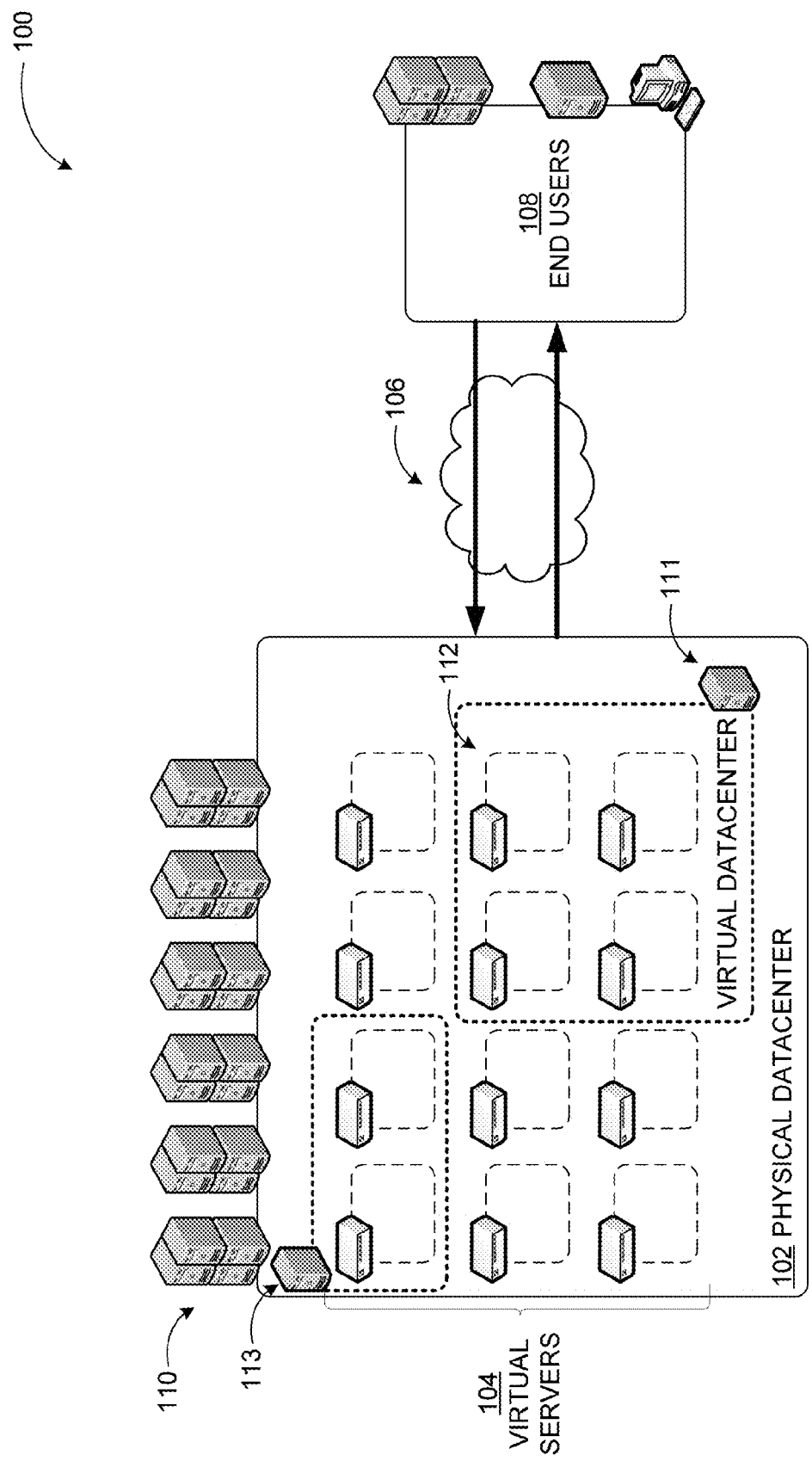
FIG. 1 includes a conceptual diagram illustrating an example datacenter-based system where a patching process associated with a cloud application may be implemented.

As briefly described above, a patching process associated with a cloud application may be defined such that a high availability (HA) of the cloud application is maintained to prevent impacting availability of the cloud application to one or more end users. A datacenter comprising one or more servers may be configured to host the cloud application. An orchestration module associated with a management system of the datacenter and/or a third-party datacenter management service may be configured to accept a list of server identities corresponding to the servers of the datacenter. HA metric values for each of the server identities may be determined in order to compute an overall HA metric value for the cloud application. A subset of the servers may be removed from a rotation framework of the cloud application based on the determined HA metric values, where the removal of the subset of the servers does not affect the overall HA metric value of the cloud application. One or more patches may be applied to each server within the subset of servers in parallel, and the subset of servers may be reinstated in the rotation framework of the cloud application upon completion of the application of the patches.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for definition of a patching process associated with a cloud application. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes a conceptual diagram illustrating an example datacenter-based system where a patching process associated with a cloud application may be implemented.

As shown in a diagram 100, a datacenter 102 may include one or more servers 110, 111, and 113 that are physical servers associated with software and underlying hardware of the datacenter 102. The one or more servers 110, 111, and 113 may be configured to execute one or more virtual servers 104. For example, the servers 111 and 113 may be configured to provide four virtual servers and two virtual servers, respectively. In some embodiments, one or more virtual servers may be combined into one or more virtual datacenters. For example, the four virtual servers provided by the servers 111 may be combined into a virtual datacenter 112. The virtual servers 104 and/or the virtual datacenter 112 may be configured to host a multitude of servers to provide cloud-related data/computing services such as various applications, data storage, data processing, or comparable ones to one or more end users 108, such as individual users or enterprise customers, via a cloud 106.

In an example embodiment, the datacenter 102 may be hosting a cloud application. An orchestration module may verify if the servers 110, 111, and 113 and/or the virtual servers 104 executed by the servers 110, 111, and 113 need to be patched in order to update programs or data, perform security compliance actions, and/or improve the usability or performance of the servers, for example. If any of the servers do not need to be patched, they may be removed from the patching process. A list of server identities corresponding to the servers 110, 111, and 113 and/or the virtual servers 104 that do need patching may be accepted at an orchestration module. The server identities may include a role of the servers 110, 111, and 113 and/or the virtual servers 104 corresponding to the identities. The roles may include a web server role, a database role, a batch job role, and an index role, for example. The orchestration module may be executed by a management system of the datacenter 102 or by a third-party datacenter management service that manages multiple datacenters and servers associated with the multiple datacenters, such as the datacenter 102 and associated servers 110, 111, and 113 and/or virtual servers 104, as will be discussed further in conjunction with FIG. 2.

HA metric values may be determined for each of the server identities on the list in order to compute an overall HA metric value for the cloud application. Measurements used to determine HA metric values may include a mean time to recover, a mean time between failures, and a number of nines, for example, where these measurements are used to determine an overall probability that the cloud application will provide high availability service to the end users 108 as required when required. The HA metric values for each of the server identities may be distinct based on a role or a cross role of the servers 110, 111, and 113 and/or the virtual servers 104 to which the identities correspond. Each role or cross role may have a different effect on the availability, which may also be dependent on other external factors, such as time of day. For example, a server with a web server role may be configured to, among other things, accept Hypertext Transfer Protocol (HTTP) requests from and provide user interfaces to the end users 108 of the cloud application in response to receiving the HTTP requests. While the absence of servers with a web server role during daytime hours may highly impact availability of the cloud application to the end users 108 when such requests are being made, the absence of servers with the web server role may not affect availability to such a high level at late night and/or early morning hours when less end users 108 are requesting.

A subset of the servers 110, 111, and 113 and/or the virtual servers 104 may then be removed from a rotation framework of the cloud application based on the determined HA metric values. The subset of servers are removed such that the removal does not affect the overall HA metric value of the cloud application in order to prevent impacting availability of the cloud application to the end users 108. Returning to the previous example, a subset of servers identified by web server roles may be removed from the rotation framework at late night and/or early morning hours when less end users 108 are requesting in order to not affect the overall HA metric value of the cloud application, thus preventing disruption of cloud application availability to the end users 108.

Once the subset of servers are removed from the rotation framework of the cloud application, active workloads on each server may be removed and/or drained in order to ensure that these servers are no longer accepting requests from and/or contributing to the cloud application, and therefore not impacting availability to end users 108 during patching. One or more patches may be applied to each server within the subset of servers in parallel. The subset of servers may be reinstated in the rotation framework of the cloud application upon completion of the application of the patches. Prior to being reinstated the active workloads may be reloaded on each server to ensure these servers are again accepting requests from and/or contributing to the cloud application to prevent impacting availability to end users 108. Once reinstated, another subset of the servers 110, 111, and 113 and/or the virtual servers 104 from the datacenter 102 may be removed from the rotation framework based on the determined HA metric values in a similar manner as described above. Accordingly, the above-defined patching process may be cyclical and continuous across multiple subsets of servers of the datacenter 102 enabling appropriate security compliance actions, maintenance, and updates to be performed without impacting availability of the cloud application to the end users 108.

Figure 2:
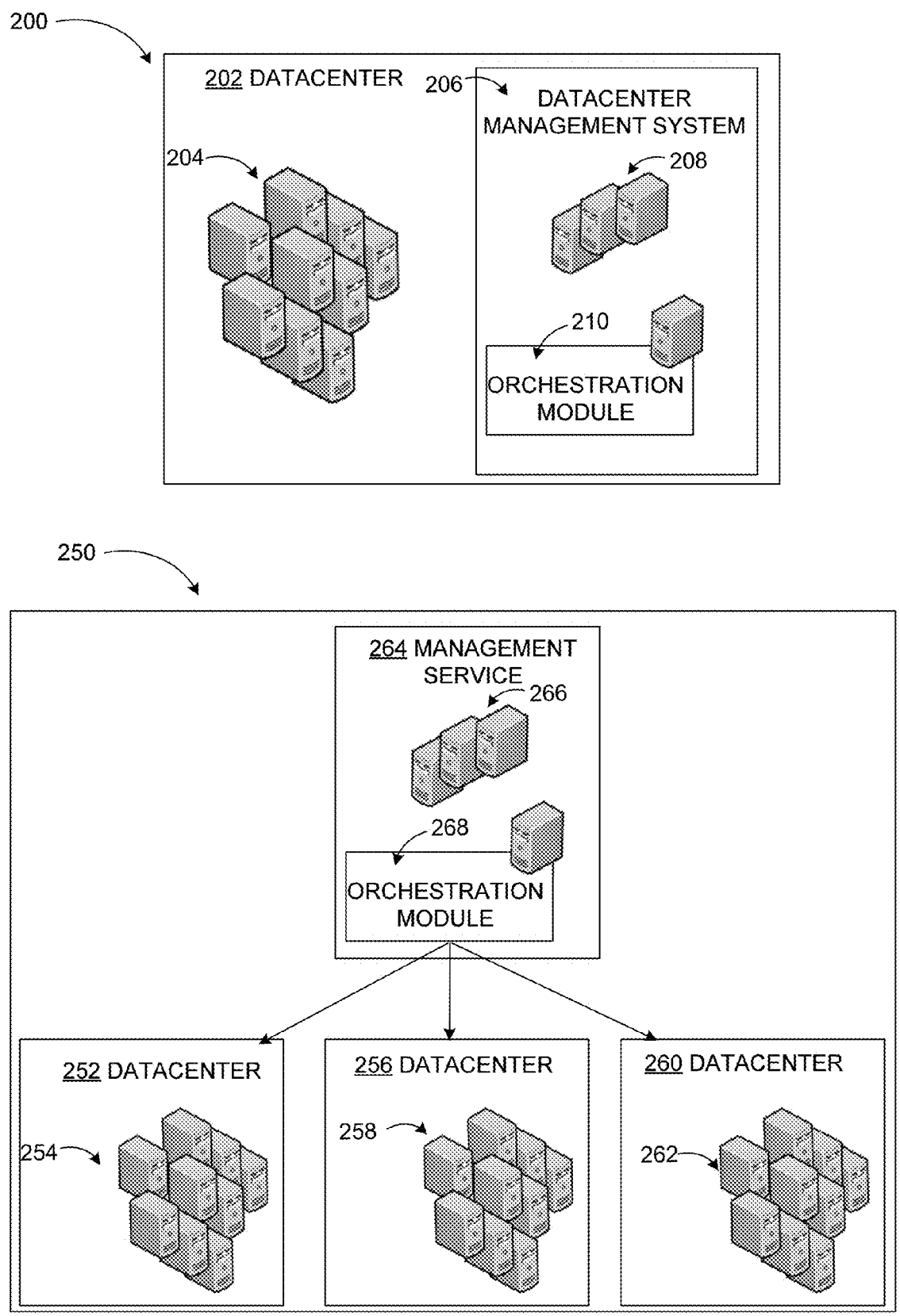
FIG. 2 illustrates an example network environment where a patching process associated with a cloud application may be defined.

FIG. 2 illustrates an example network environment where a patching process associated with a cloud application may be defined, according to some embodiments.

As illustrated in diagram 200, a datacenter 202 may include one or more servers 204, and a datacenter management system 206 configured to manage the servers 204 of the datacenter 202. The datacenter management system 206 may include one or more data management servers 208, of which, at least one may be operable to execute an orchestration module 210. In some examples, the datacenter 202 may be configured to host a cloud application. The orchestration module 210 may be configured to accept a list of server identities corresponding to the servers 204 of the datacenter 202 and determine HA metric values for each of the server identities on the list in order to compute an overall HA metric value for the cloud application. The orchestration module 210 may be further configured to remove a subset of the servers 204 from a rotation framework of the cloud application based on the determined HA metric values, apply one or more patches to each server within the subset of servers 204 in parallel, and reinstate the subset of servers 204 in the rotation framework of the cloud application upon completion of the application of the patches.

Alternately, as illustrated in diagram 250, a datacenter management service 264 may be configured to manage a plurality of datacenters, such as datacenters 252, 256, 260, and a plurality of servers associated with the plurality of datacenters, such as servers 254, 258, and 262, respectively. The datacenter management service 264 may include one or more data management servers 266, of which, at least one may be operable to execute an orchestration module 268. The orchestration module 268 may be configured to perform actions similar to the orchestration module 210, discussed above in conjunction with the diagram 200.

Figure 3A:
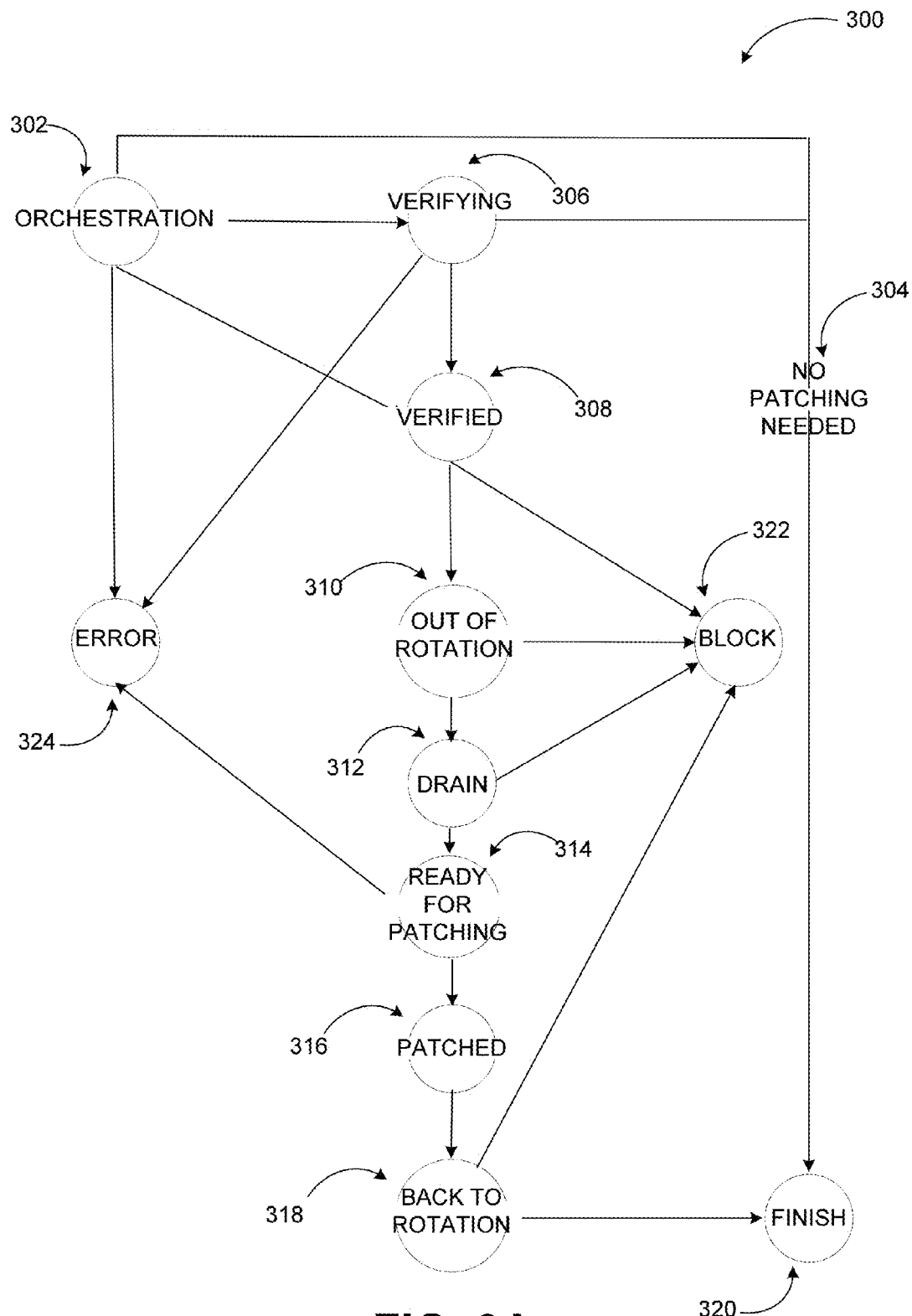
FIGS. 3A and 3B illustrate an example patching process associated with a cloud application.
Figure 3B:
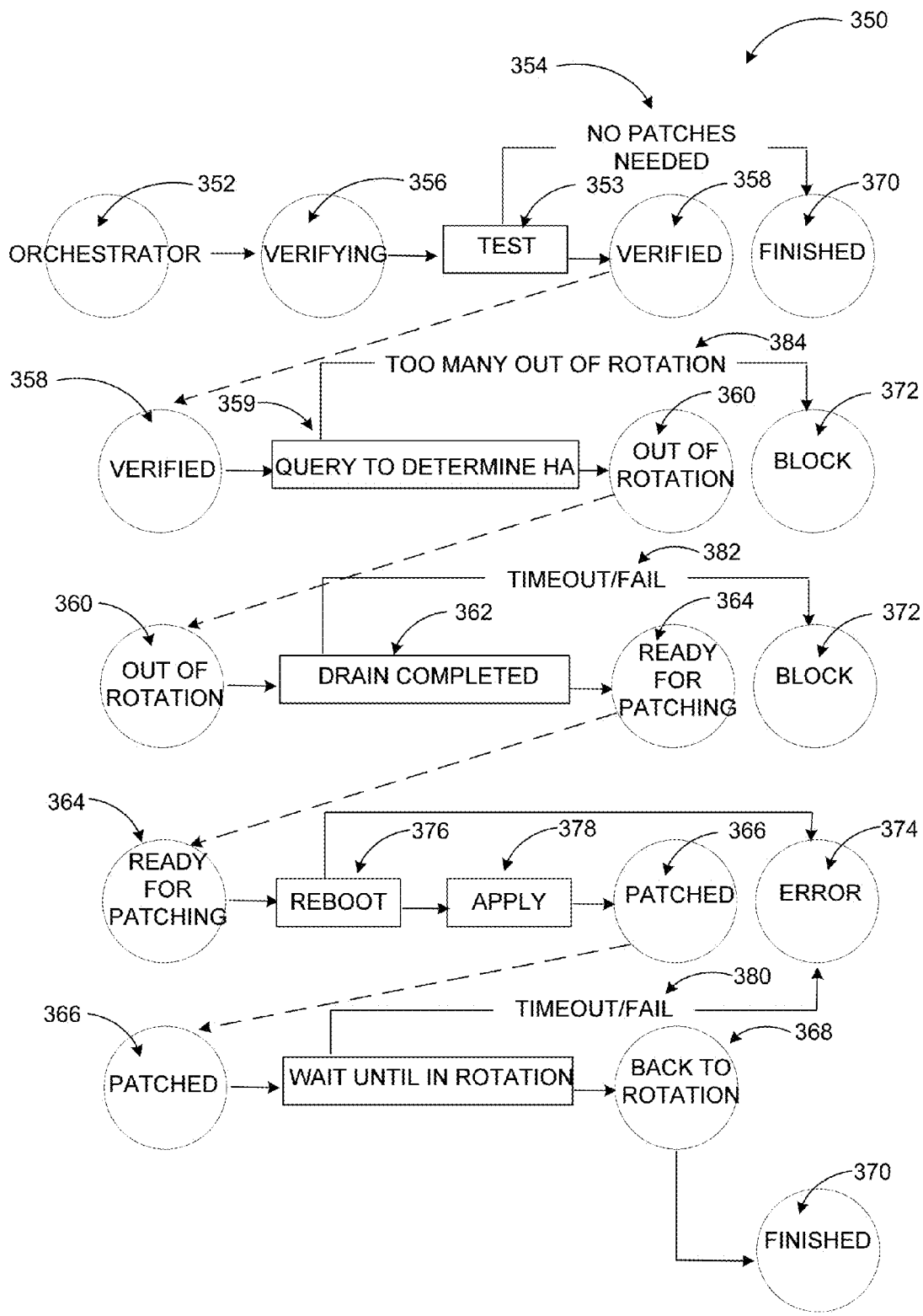

FIGS. 3A and 3B illustrate an example patching process associated with a cloud application, according to some embodiments.

As illustrated in diagram 300, a list of server identities corresponding to one or more servers of a datacenter hosting a cloud application may be accepted at an orchestration module 302. The orchestration module 302 may determine if any patching needs to be performed on the servers for security compliance, maintenance, and/or performance improvement purposes, for example, automatically or through a verifying 306 process. If it is determined that no patching is needed 304, then the servers may be removed from the patching process and the patching process may be finished 320. If it is determined that patching is needed, then the orchestration module 302 may be configured to verify the list of server identities corresponding to the servers of the datacenter. The server identities may include a role of the servers corresponding to the identities, such as a web server role, a database role, a batch job role, and an index role, for example. Once verified 308, HA metric values may be determined for each of the server identities on the list in order to compute an overall HA metric value for the cloud application. Measurements used to determine HA metric values may include a mean time to recover, a mean time between failures, and a number of nines, for example, where these measurements are used to determine an overall probability that the cloud application will provide high availability service to the end users as required when required. The HA metric values for each of the server identities may be distinct based on a role or a cross role of the servers to which the identities correspond. Each role or cross role may have a different effect on the availability of service, which may also be dependent on other external factors, such as time of day. For example, a server with a batch job role may be configured to, among other things, route, queue, modify, and execute batch jobs. Batch jobs tend to accumulate during daytime hours when many end users are interacting with the cloud application, and the batch jobs are then executed during the late evening and/or early morning hours. While the absence of servers with batch job roles may have an impact on availability of the cloud application during the late evening and/or early morning hours when the batch jobs are being executed, the absence of servers with batch job role may not affect availability during daytime hours when the batch jobs are accumulating.

A subset of the servers may then be removed from a rotation framework of the cloud application (i.e., out of rotation 310) based on the determined HA metric values. The subset of servers are removed such that the removal does not affect the overall HA metric value of the cloud application in order to prevent impacting availability of the cloud application to the end users. Returning to the previous example, a subset of servers identified by batch job roles may be removed from the rotation framework during daytime hours when batch jobs are accumulating in order to not affect the overall HA metric value of the cloud application, thus preventing disruption of cloud application availability to the end users.

Once the subset of servers are removed from the rotation framework of the cloud application, active workloads on each server may be removed and/or drained 312 in order to ensure that these servers are no longer contributing to the cloud application such that availability to end users is not impacted during patching. Once ready for patching 314, one or more patches may be applied to each server within the subset of servers in parallel. Once patched 316, the subset of servers may be reinstated in the rotation framework of the cloud application (i.e., back to rotation 318) upon completion of the application of the patches in order to finish 320 the patching process. Prior to being reinstated the active workloads may be reloaded on each server to ensure these servers are again contributing to the cloud application to prevent impacting availability to end users. Once the patching process has finished 320, another subset of the servers from the datacenter may be removed from the rotation framework (i.e., out of rotation 310) based on the determined HA metric values in a similar manner as described above. Accordingly, the above-defined patching process may be cyclical and continuous across multiple subsets of servers of the datacenter enabling patching to be performed without impacting availability of the cloud application to the end users.

The orchestration module 302 may be configured to block 322 one or more servers from finishing the patching process at various stages of the patching process, as well as determine potential errors 324 at various stages of the patching process, which will be discussed further in conjunction with diagram 350. Additionally, each stage in the patching process may be retried, if necessary.

Diagram 350 illustrates each stage of the patching process in detail. A list of server identities corresponding to one or more servers of a datacenter hosting a cloud application may be accepted at an orchestration module 352. The orchestration module 352 may determine if any patching needs to be performed on the servers automatically or through a verifying 356 process. If it is determined through a test 353 of the verifying 356 process that no patching is needed 354, then the servers may be removed from the patching process and the patching process may be finished 370. If it is determined that patching is needed, then the orchestration module 302 may be configured to verify 358 the list of server identities corresponding to the servers of the datacenter.

Once verified 358, a query 359 to determine HA metric values for each of the server identities on the list may be executed in order to compute an overall HA metric value for the cloud application. A subset of the servers may then be removed from a rotation framework of the cloud application (i.e., out of rotation 360) based on the determined HA metric values. The subset of servers are removed such that the removal does not affect the overall HA metric value of the cloud application in order to prevent impacting availability of the cloud application to the end users. Alternatively, if it is determined that too many servers are already out of rotation 384 (i.e., a threshold of the servers has already been removed from the rotation framework), and therefore, the overall HA metric value of the cloud application will be affected if the subset of servers are removed, the patching process may be blocked 372.

Once the subset of servers are removed from the rotation framework of the cloud application (i.e., out of rotation 360), active workloads on each server may be removed and/or drained 362 to make ready for patching 364 in order to ensure that these servers are no longer accepting requests from and/or contributing to the cloud application such that availability to end users is not impacted during patching. Alternatively, if the removal and/or draining of the active workloads times out or fails 382, the patching process may be blocked 372.

Once ready for patching 364, one or more patches may be applied 378 to each server within the subset of servers in parallel such that the servers are patched 366 simultaneously. Alternatively, if the servers are rebooted 376, an error 374 may be determined and the servers may be prevented from being patched 366. Once patched 366, the subset of servers may be reinstated in the rotation framework of the cloud application (i.e., back in rotation 368) upon completion of the application of the patches in order to finish 370 the patching process. Prior to being reinstated the active workloads may be reloaded on each server to ensure these servers are again accepting requests from and/or contributing to the cloud application to prevent impacting availability to end users. Alternatively, if a time out or failure 380 occurs in the subset of servers being reinstated in the rotation framework, an error 374 may be determined and the servers may be prevented from being reinstated.

Figure 4:
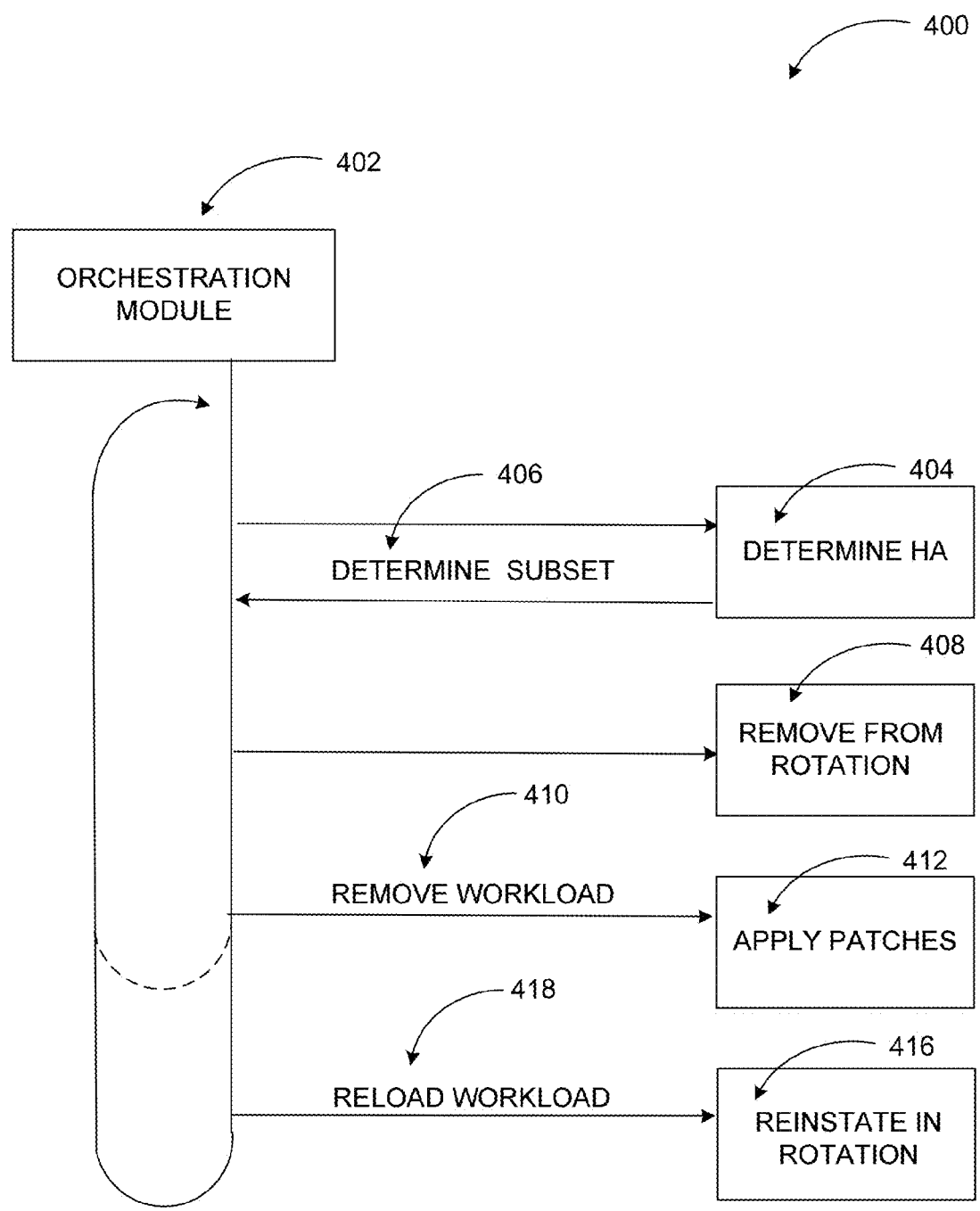
FIG. 4 illustrates another example patching process associated with a cloud application.

FIG. 4 illustrates another example patching process associated with a cloud application, according to embodiments.

As illustrated in diagram 400, an orchestration module 402 may be configured to verify if one or more servers of a datacenter hosting a cloud application need patching, remove any servers from a patching process that do not need patching, and accept a list of server identities corresponding to servers that do need patching. The server identities may include a role of each server, such as a web server role, a database role, a batch job role, and an index role, for example.

HA metric values may be determined (e.g., operation 404) for each of the server identities on the list in order to compute an overall HA metric value for the cloud application. Measurements used to determine HA metric values may include a mean time to recover, a mean time between failures, and a number of nines, for example, where these measurements are used to determine an overall probability that the cloud application will provide high availability service to the end users as required when required. The HA metric values for each of the server identities may be distinct based on a role or a cross role of the servers to which the identities correspond. Each role or cross role may have a different effect on the availability of the application, which may also be dependent on other external factors, such as time of day. For example, a server with a database role may be configured to, among other things, store and persist data. The absence of servers with a database role may highly impact availability of the cloud application to the end users during daytime hours when users are inputting data to be stored and accessing/editing data that needs to be persisted. However, the absence of servers with the database role from the rotation framework may not affect availability to such a high level at late night and/or early morning hours when less end users are inputting data to be stored and accessing/editing data that needs to be persisted.

A subset of the servers may be determined (e.g., operation 406) based on the determined HA metric values such that removal of the subset from a rotational framework of the cloud application will not affect the overall HA metric value of the cloud application. The subset of servers may then be removed from a rotation framework of the cloud application (e.g., operation 408). Returning to the previous example, a subset of servers identified by database roles may be removed from the rotation framework at late night and/or early morning hours when less end users are inputting data and accessing/editing data to be persisted to not affect the overall HA metric value of the cloud application, thus preventing disruption of cloud application availability to the end users.

Once the subset of servers are removed from the rotation framework of the cloud application, active workloads on each server may be removed and/or drained (e.g., operation 410) in order to ensure that these servers are no longer accepting requests from and/or contributing to the cloud application, and therefore not impacting availability to end users during patching. One or more patches may be applied to each server within the subset of servers in parallel (e.g., operation 412). Once patched, the active workloads may be reloaded on each server (e.g., operation 414) to ensure these servers are again accepting requests from and/or contributing to the cloud application to prevent impacting availability to end users. The subset of servers may then be reinstated in the rotation framework of the cloud application (e.g., operation 416) upon completion of the application of the patches. Once reinstated, another subset of the servers from the datacenter may be removed from the rotation framework based on the determined HA metric values in a similar manner as described above. Accordingly, the above-defined patching process may be cyclical and continuous across multiple subsets of servers of the datacenter enabling patching to be performed without impacting availability of the cloud application to the end users.

The examples in FIG. 1 through 4 have been described with specific platforms including datacenters, systems, servers, applications, modules, and interactions. Embodiments are not limited to systems according to these example configurations. A patching process associated with a cloud application may be defined and implemented in configurations using other types of platforms including datacenters, systems, servers, applications, modules, and interactions in a similar manner using the principles described herein.

Figure 5:
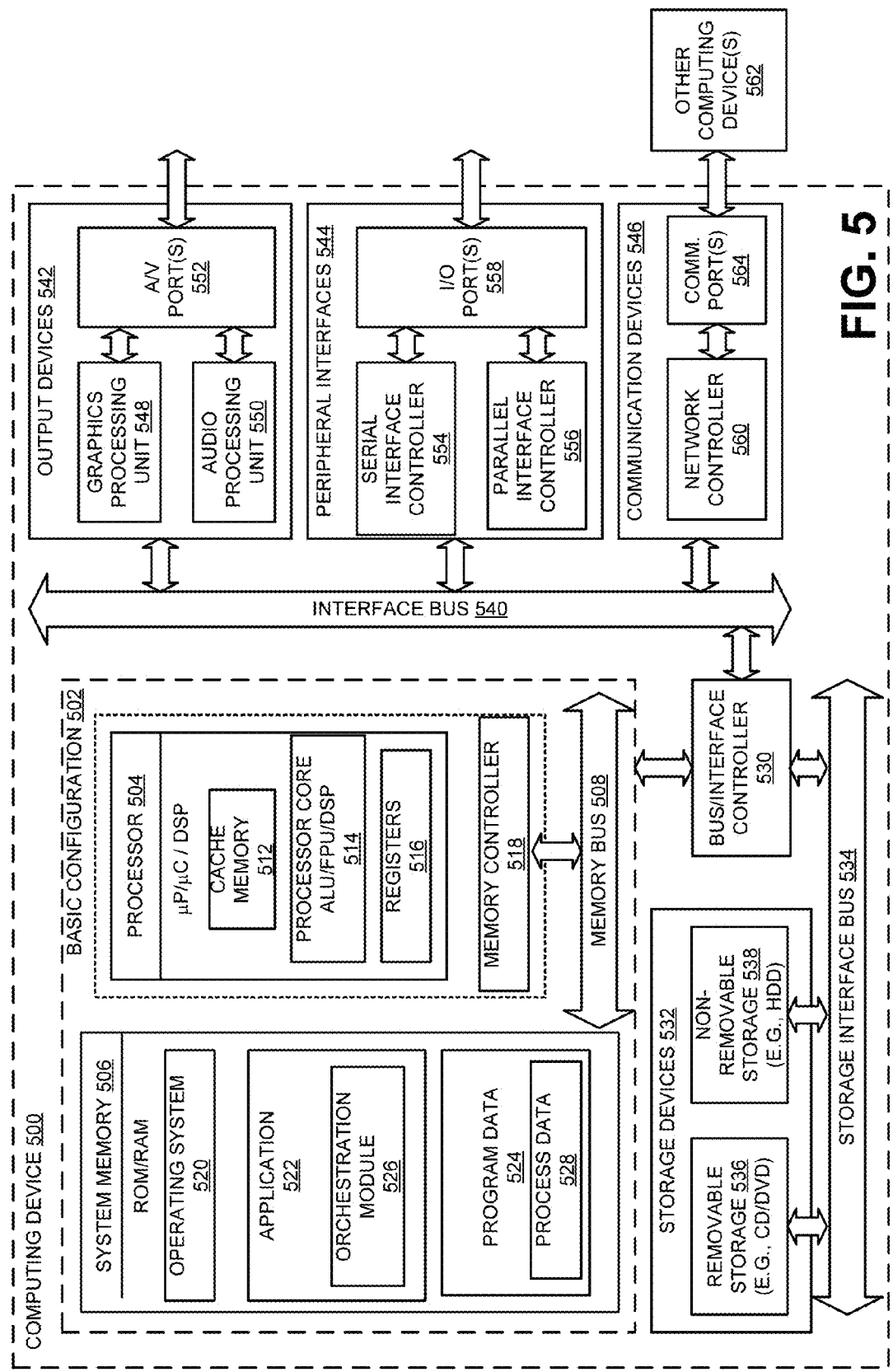
FIG. 5 is a block diagram of an example general purpose computing device, which may be used to define a patching process associated with a cloud application.

FIG. 5 and the associated discussion are intended to provide a brief, general description of a general purpose computing device, which may be used to define a patching process associated with a cloud application, arranged in accordance with at least some embodiments described herein.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an application 522, and program data 524. The application 522 may include an orchestration module 526, which may be an integral part of the application or a separate application on its own. The orchestration module 526 may be configured to accept a list of server identities corresponding to one or more servers of a datacenter hosting a cloud application, and determine HA metric values for each of the server identities on the list in order to compute an overall HA metric value for the cloud application. The orchestration module 526 may be further configured to remove a subset of the servers from a rotation framework of the cloud application based on the determined HA metric values, apply one or more patches to each server within the subset of servers in parallel, and reinstate the subset of servers in the rotation framework of the cloud application upon completion of the application of the patches. The program data 524 may include, among other data, process data 528 related to HA metric values, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to define a patching process associated with a cloud application. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
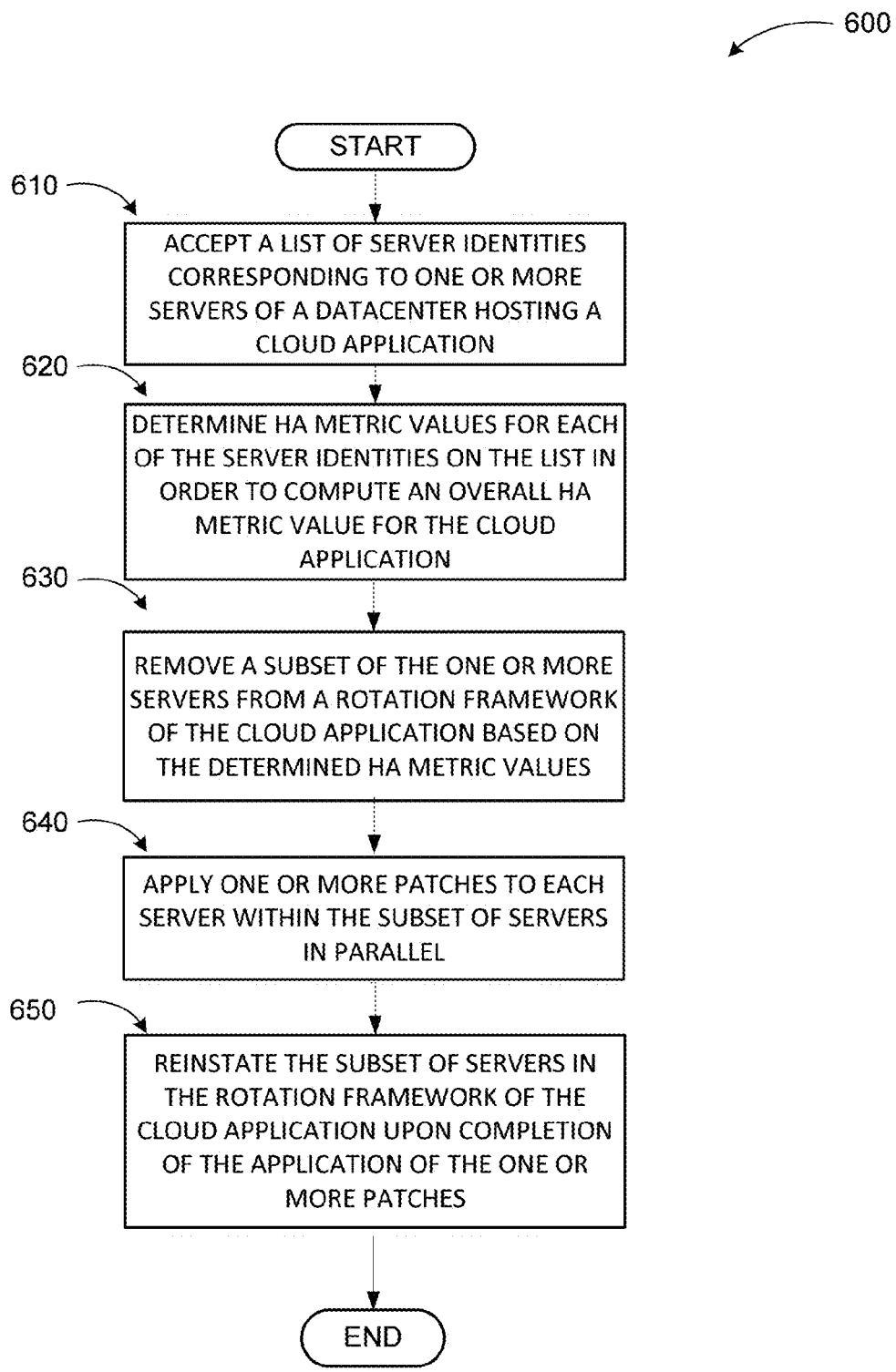
FIG. 6 illustrates a logic flow diagram of a method to define a patching process associated with a cloud application, according to embodiments.

FIG. 6 illustrates a logic flow diagram for process 600 of a method to define and implement a patching process associated with a cloud application, according to embodiments. Process 600 may be implemented on a server or other system.

Process 600 begins with operation 610, where a list of server identities corresponding to one or more servers of a datacenter hosting a cloud application may be accepted at an orchestration module. The orchestration module may be executed by one or more servers within a datacenter management system of the datacenter hosting the cloud application. Alternately, the orchestration module may be executed by one or more servers of a datacenter management service that manages a plurality of datacenters and one or more servers associated with the plurality of datacenters, such as the datacenter hosting the cloud application. The server identities may include a role of the servers to which the identities correspond. Example roles may include a web server role, a database role, a batch job role, and an index role, among other roles.

At operation 620, HA metric values may be determined for each of the server identities on the list in order to compute an overall HA metric value for the cloud application. The HA metric values for each of the server identities may be distinct based on a role or a cross-role of the servers to which the identities correspond. Each role or cross role may have a different effect on the availability of the cloud application, which may also be dependent on other external factors, such as time of day. Therefore, the HA metric values determined for each server identity on the list based on the roles of the corresponding servers may be combined in order to compute an overall HA metric value for the cloud application.

At operation 630, a subset of the one or more servers may be removed from a rotation framework of the cloud application based on the determined HA metric values to ensure that removal of the subset of servers from the rotation framework does not affect the overall HA metric value of the cloud application. Once the subset of servers is removed from the rotation framework of the cloud application, active workloads on each server may be removed in order to ensure that these servers are no longer accepting requests and/or contributing to the cloud application, and therefore not affecting availability to end users.

At operation 640, one or more patches may be applied to each server within the subset of servers in parallel. At operation 650, the subset of servers are reinstated in the rotation framework of the cloud application upon completion of the application of the patches. Prior to being reinstated, the active workloads are placed back on each server to ensure these servers are again contributing to the cloud application. Once reinstated, another subset of servers from the datacenter may be removed from the rotation framework based on the determined HA metric values in a similar manner as described above, such that the patching process may be cyclical and continuous across the servers of the datacenter without affecting availability of the cloud application to the end users.

The operations included in process 600 are for illustration purposes. Definition of a patching process associated with a cloud application may be implemented by similar processes with fewer or additional steps, as well as in different order of operations using the principles described herein.

According to some examples, methods to define a patching process associated with a cloud application are provided. An example method may include accepting a list of server identities corresponding to one or more servers of a datacenter hosting the cloud application, determining HA metric values for each of the server identities on the list in order to compute an overall HA metric value for the cloud application, and removing a subset of the servers from a rotation framework of the cloud application based on the determined HA metric values, where the removal of the subset of servers from the rotation framework may not affect the overall HA metric value of the cloud application. The example method may also include applying one or more patches to each server within the subset of servers in parallel, and reinstating the subset of servers in the rotation framework of the cloud application upon completion of the application of the patches.

In other examples, another subset of the servers may be removed from the rotation framework of the cloud application based on the determined HA metrics in response to the subset of servers being reinstated into the rotation framework of the cloud application, where the removal of the other subset of servers from the rotation framework may not affect the overall HA metric value of the cloud application. One or more patches may be applied to each server in the other subset of servers in parallel, and the other subset of servers may be reinstated in the rotation framework of the cloud application upon completion of the application of the patches. Determining the HA metric values for each of the server identities may include computing the HA metric values using a mean time to recover, a mean time between failures, and/or a number of nines. The example method may further include verifying if the servers of the datacenter hosting the cloud application need patching prior to accepting the list of server identities, and if at least one of the servers of the datacenter hosting the cloud application does not need patching, removing the at least one server from the patching process.

In further examples, the removal of the subset of servers from the rotation framework may be blocked in response to a determination that a threshold of the servers has already been removed from the rotation framework such that the overall HA metric value of the cloud application is affected if the subset of servers are removed. Active workloads may be removed from each server within the subset of servers in order to apply the patches to each server. The application of the patches to each server within the subset of servers may be blocked in response to a determination of a time out or a failure of the removing of the active workloads. The active workloads may be reloaded to each server within the subset of servers upon completion of the application of the patches. An error may be determined in response to a determination that at least one server within the subset of servers is rebooted prior to the application of the patches. An error may further be determined in response to a time out or a failure of the reinstating of the subset of servers in the rotation framework of the cloud application.

According to some embodiments, systems to define a patching process associated with a cloud application are described. An example system may include a datacenter comprising one or more servers, where the datacenter is configured to host the cloud application, and an orchestration module. The orchestration module may be configured to accept a list of server identities corresponding to the servers of the datacenter, determine HA metric values for each of the server identities on the list in order to compute an overall HA metric value for the cloud application, and remove a subset of the servers from a rotation framework of the cloud application based on the determined HA metric values, where the removal of the subset of servers from the rotation framework may not affect the overall HA metric value of the cloud application. The orchestration module may also be configured to apply one or more patches to each server within the subset of servers in parallel, where active workloads from each server within the subset of servers are removed in order to apply the patches, and reinstate the subset of servers in the rotation framework of the cloud application upon completion of the application of the patches.

In other embodiments, the orchestration module may be executed by a management server of the datacenter hosting the cloud application. The orchestration module may be executed by a datacenter management service that manages a plurality of datacenters and one or more servers associated with the plurality of datacenters. The server identities may include a role or a cross-role of the corresponding one or more servers of the datacenter hosting the cloud application, where the role includes a web server role, a database role, a batch job role, and/or an index role. The role may contribute to a distinct HA metric value for each of the server identities based on one or more external factors.

According to some examples, a computer-readable memory device with instructions stored thereon to define a patching process associated with a cloud application is described. Example instructions may include verifying if one or more servers of a datacenter hosting the cloud application need patching, and if at least one server does not need patching, removing the at least one server from the patching process. The example instructions may also include accepting a list of server identities corresponding to servers of the datacenter that need patching, determining HA metric values for each of the server identities on the list in order to compute an overall HA metric value for the cloud application, and removing a subset of the servers from a rotation framework of the cloud application based on the determined HA metric values, where the removal of the subset of servers from the rotation framework may not affect the overall HA metric value of the cloud application. The example instructions may further include applying one or more patches to each server within the subset of servers in parallel, and reinstating the subset of servers in the rotation framework of the cloud application upon completion of the application of the patches.

In other examples, active workloads from each server within the subset of servers may be removed in order to apply the patches to each server, and the active workloads may be reloaded to each server within the subset of servers upon completion of the application of the patches.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to define a patching process associated with a cloud application, the method comprising:
receiving a list of a plurality of server identities corresponding to a plurality of servers of a datacenter hosting the cloud application;
determining a plurality of high availability (HA) metric values for the plurality of servers, wherein each HA metric value corresponds to a particular server of the plurality of servers and is determined based on at least one of:
a mean time of the particular server to recover from a failure;
a mean time between failures of the particular server, or an availability percentage of the particular server;
computing an overall HA metric value for the cloud application based on the high availability (HA) metric values determined for the plurality of servers, wherein the overall HA metric value indicates an availability of a service provided by the cloud application to an end user;
based on the plurality of HA metric values, determining an impact of each of the plurality of servers on the overall HA metric value of the cloud application;
based on the determined impact of each of the plurality of servers on the overall HA metric value, identifying a subset of the plurality of servers to be removed from a rotation framework of the cloud application;
removing each server in the subset from the rotation framework of the cloud application;
applying one or more patches to each server within the subset; and
reinstating each server in the subset in the rotation framework of the cloud application upon completion of the application of the one or more patches.

2. The method of claim 1, further comprising:
in response to the subset of servers being reinstated into the rotation framework of the cloud application, removing another subset of the one or more servers from the rotation framework of the cloud application based on the determined HA metrics, wherein the removal of the other subset of servers from the rotation framework does not affect the overall HA metric value of the cloud application.

3. The method of claim 2, further comprising:
applying one or more patches to each server in the other subset of servers in parallel; and
reinstating the other subset of servers in the rotation framework of the cloud application upon completion of the application of the one or more patches.

4. The method of claim 1, wherein determining the HA metric values corresponding to each particular server comprises:
computing the HA metric values using a number of nines.

5. The method of claim 1, and further comprising:
verifying if the one or more servers of the datacenter hosting the cloud application need patching prior to accepting the list of server identities.

6. The method of claim 5, and further comprising:
if at least one of the one or more servers of the datacenter hosting the cloud application does not need patching, removing the at least one server from the patching process.

7. The method of claim 1, further comprising:
blocking the removal of the subset of servers from the rotation framework in response to a determination that a threshold of the one or more servers has already been removed from the rotation framework such that the overall HA metric value of the cloud application is affected if the subset of servers are removed.

8. The method of claim 1, further comprising:
removing active workloads from each server within the subset of servers in order to apply the one or more patches to each server.

9. The method of claim 8, further comprising:
blocking the application of the one or more patches to a particular server within the subset in response to a determination of at least one of:
a time out in removing an active workload from the particular server; and
a failure in removing an active workload from the particular server.

10. The method of claim 8, further comprising:
reloading the active workloads to each server within the subset of servers upon completion of the application of the one or more patches.

11. The method of claim 1, further comprising:
determining an error in response to a determination that at least one server within the subset of servers is rebooted prior to the application of the one or more patches.

12. The method of claim 11, further comprising:
determining an error in response to one of a time out and a failure of the reinstating of the subset of servers in the rotation framework of the cloud application.

13. A computing system comprising:
a datacenter comprising a plurality of servers, the datacenter configured to host a cloud application; and
an orchestration module configured to:
receive a list of a plurality of server identities corresponding to the plurality of servers of the datacenter;
determine a plurality of high availability (HA) metric values for the plurality of servers, wherein each HA metric value corresponds to a particular server of the plurality of servers and is determined based on at least one of:
a mean time of the particular server to recover from a failure;
a mean time between failures of the particular server; or
an availability percentage of the particular server;
compute an overall HA metric value for the cloud application based on the high availability (HA) metric values determined for the plurality of server, wherein the overall HA metric value indicates an availability of a service provided by the cloud application to an end user;
based on the plurality of HA metric values, determining an impact of each of the plurality of servers on the overall HA metric value of the cloud application;
based on the determined impact of each of the plurality of servers on the overall HA metric value, identify a subset of the plurality of servers to be removed from a rotation framework of the cloud application;
remove each server in the subset from the rotation framework of the cloud application;
apply one or more patches to each server within the subset in parallel, wherein active workloads from each server within the subset of servers are removed in order to apply the one or more patches; and
reinstate each server in the subset of servers in the rotation framework of the cloud application upon completion of the application of the one or more patches.

14. The system of claim 13, wherein the orchestration module is executed by a management server of the datacenter hosting the cloud application.

15. The system of claim 13, wherein the orchestration module is executed by a datacenter management service that manages a plurality of datacenters and one or more servers associated with the plurality of datacenters.

16. The system of claim 13, wherein the server identities include a role of the corresponding one or more servers of the datacenter hosting the cloud application.

17. The system of claim 16, wherein the role includes one or more of a web server role, a database role, a batch job role, and an index role.

18. The system of claim 16, wherein the HtA metric value for each of the server identities is based on the role.

19. A computer-readable hardware memory device with instructions stored thereon to define a patching process associated with a cloud application, the instructions comprising:
verifying if each of a plurality of servers of a datacenter hosting the cloud application needs patching,
if at least one server does not need patching, removing the at least one server from the patching process;
determining a plurality of high availability (HA) metric values for a set of servers that need patching, wherein each HA metric value corresponds to a particular server of the set of servers and is determined using at least one of:
a mean time of the particular server to recover from a failure;
a mean time between failures of the particular server; or
an availability percentage of the particular server;
computing an overall HA metric value for the cloud application based on the HA metric values determined the plurality of servers, wherein the overall HA metric value indicates an availability of a service provided by the cloud application to an end user;
based on the plurality of HA metric values, determining an impact of each of the set of servers on the overall HA metric value of the cloud application;
based on the determined impact of each of the set of servers on the overall HA metric value, identifying a subset of the set of servers to be removed from a rotation framework of the cloud application;
removing each server in the subset of servers from a rotation framework of the cloud application;
applying one or more patches to each server within the subset of servers in parallel; and
reinstating the subset of servers in the rotation framework of the cloud application upon completion of the application of the one or more patches.

20. The computer-readable memory hardware device of claim 19, further comprising:
removing active workloads from each server within the subset of servers in order to apply the one or more patches to each server; and
reloading the active workloads to each server within the subset of servers upon completion of the application of the one or more patches.

* * * * *